United States Patent
Ding et al.

(10) Patent No.: US 9,049,738 B2
(45) Date of Patent: Jun. 2, 2015

(54) SECTORIZED SCHEDULING METHOD FOR THE HIGH SPEED UPLINK PACKET ACCESS SERVICE AND THE SYSTEM THEREOF

(75) Inventors: Jiewei Ding, Shenzhen (CN); Yuanping Zheng, Shenzhen (CN); Changchun Tang, Shenzhen (CN); Chen Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 672 days.

(21) Appl. No.: 13/000,878

(22) PCT Filed: Dec. 30, 2008

(86) PCT No.: PCT/CN2008/002137
§ 371 (c)(1),
(2), (4) Date: Dec. 22, 2010

(87) PCT Pub. No.: WO2009/155740
PCT Pub. Date: Dec. 30, 2009

(65) Prior Publication Data
US 2012/0020228 A1   Jan. 26, 2012

(30) Foreign Application Priority Data
Jun. 23, 2008   (CN) .......................... 2008 1 0067982

(51) Int. Cl.
*H04W 72/12*   (2009.01)
*H04W 72/04*   (2009.01)
*H04W 88/08*   (2009.01)

(52) U.S. Cl.
CPC ........ *H04W 72/1252* (2013.01); *H04W 72/046* (2013.01); *H04W 88/08* (2013.01)

(58) Field of Classification Search
CPC .......... H04W 72/046; H04W 72/1252; H04W 88/08
USPC ........ 370/240, 252; 455/403, 422.1, 450, 453
See application file for complete search history.

(56) References Cited

U.S. PATENT DOCUMENTS

2009/0088080 A1*   4/2009   Zhang et al. .................. 455/63.1
2010/0087154 A1*   4/2010   Englund et al. ............ 455/67.13

FOREIGN PATENT DOCUMENTS

CN   1758804 A   4/2006
CN   1863018 A   11/2006
(Continued)

OTHER PUBLICATIONS

Ghosh, et al., "Uplink-Downlink Imbalance in Wireless Cellular Networks," IEEE Communications Society, 2007, pp. 4275-4280, IEEE.
(Continued)

*Primary Examiner* — Un C Cho
*Assistant Examiner* — Siming Liu
(74) *Attorney, Agent, or Firm* — Walker & Jocke

(57) ABSTRACT

A sectorized scheduling method for the high speed uplink packet access service is provided in the present invention, the method comprises: obtaining the current sector load of each sector and the current high speed uplink packet access service HSUPA mobile station load of each sector, and the maximal allowable sector load of each sector; obtaining the rest available sector load based on the maximal allowable load and the current sector load, performing load assignment for each sector based on the rest available sector load and the distribution of HSUPA mobile station in various sectors. A sector based scheduling system for the high speed uplink packet access service is also provided in the present invention. The present invention correctly associates the HSUPA UE load and the sector load, solves the problem of the larger overload or the larger underload, and improves the HSUPA throughput by several times.

9 Claims, 3 Drawing Sheets

(56) References Cited

FOREIGN PATENT DOCUMENTS

| CN | 1933352 A | 3/2007 |
|---|---|---|
| CN | 101035085 A | 9/2007 |
| WO | 2004/068808 A1 | 8/2004 |
| WO | WO 2004068808 A1 * | 8/2004 |

OTHER PUBLICATIONS

Liu, et al., "Research on Rate Allocation Schemes for the Reverse Link in CDMA2000 System," The 17th Annual IEEE International Symposium on Personal, Indoor and Mobile Radio Communications, 2006, pp. 1-5, IEEE.

Supplementary European Search Report, European Patent Office, Feb. 6, 2012, Netherlands.

* cited by examiner

SECTORIZED SCHEDULING METHOD FOR THE HIGH SPEED UPLINK PACKET ACCESS SERVICE AND THE SYSTEM THEREOF

FIELD OF THE INVENTION

The present invention relates to communication field, in particular to a sectorized scheduling method and system for the HSUPA (High-Speed Uplink Packet Access) service in the WCDMA (Wideband Code Division Multiple Access) communication system.

BACKGROUND OF THE INVENTION

In the WCDMA communication system, currently there is an application that a cell is divided into a plurality of sectors according to various network operation requirements, such as OTSR (Omni-Transmission Sectorized Receive) mode, wherein a downlink signal of one cell is transmitted in the whole cell while an uplink signal is received from a plurality of sectors. Since the uplink transmission power of the WCDMA system is limited, in this way, a larger network coverage in a flat area can be realized with less cost, or a network coverage in a complex urban district can be realized with flexibility, the number of cells is reduced and network configuration is simplified. Other modes, such as the cell portion mode defined in the 3GPP (the 3rd Generation Partnership Project), the simulcast mode in the related filed, also employ sectorized method. The sectorized method can improve the uplink receiving ability and system capacity and is applied to the commercial network of WCDMA R99.

In the new version R6, the HSUPA service is introduced, and the mobile station using the HSUPA service is referred to as HSUPA UE (HSUPA User Equipment), of which the key technology is that the base station (Node B) needs to schedule the load of the uplink of the HSUPA UE. The load size can be measured using RTWP (Received Total Wideband Power), the more the elevation of the RTWP, the higher the load. According to 3GPP 25.433, the system will set an RTWP reference value (Reference Received Total Wideband Power) and an RTWP target value (Maximum Target Received Total Wideband Power), respectively referred to as RTWPref and RTWPtarget, wherein RTWPref corresponds to the system receiving noise (background noise) when there is no any mobile station (UE: User Equipment) in the current cell, if the RTWP of the current system is RTWPcurrent, then the current system load can be expressed as:

$$L = (\text{RTWPcurrent} - \text{RTWPref})/\text{RTWPcurrent} \tag{1}$$

It can be seen from Equation (1) that, when the current RTWP of the system is raised to twice (3 dB) of the background noise, the system load is 0.5 (i.e., 50%); when the current RTWP of the system is raised to 4 (6 dB) times of the background noise, the system load is 0.75 (i.e., 75%). RTWPtarget corresponds to the allowable load used by the system, for instance, when RTWPtarget is 4 times (6 dB) of RTWPref, the allowable load used by the system is 0.75. The system makes a greatest effort to make RTWP not more than RTWPtarget when scheduling the load. One conventional dispatching process is: Node B calculates the rest available load according to the measurement results of RTWP. The estimation result of the SIR (Signal to Interference Ratio) of each HSUPA UE is used to calculate the load consumed by each HSUPA UE. Then, the rest available load is scheduled to each HSUPA UE. Generally, the calculation of the load dispatching is performed according to the whole cell and the HSUPA UE within the cell, wherein the method of load estimation according to the SIR of the HSUPA UE is:

$$L = \text{SIR}/(1+\text{SIR}) \tag{2}$$

wherein L is the load of the HSUPA UE, SIR is the SIR of the HSUPA UE.

FIG. 1 is the schematic diagram of the conventional HSUPA scheduling method for a conventional cell. In the conventional HSUPA scheduling method, each HSUPA UE has only one SIR estimation in each cell, the scheduler utilizes this SIR to calculate the load occupied by the UE. The conventional cell also has only one value, and the dispatcher directly utilizes this value to calculate the cell load. In this case, HSUPA function runs properly and the throughput of the HSUPA is that of one cell. In 3GPP R6 version, the maximum HSUPA throughput of such a cell is 5.76 Mbps. The conventional HSUPA scheduling method is performed on the cell-base.

However, in the sectorized receiving mode, the uplink signals are received by the antennas of the base station in multiple sectors, the signals of the multi-sector antennas are combined in the baseband processing. For an HSUPA scheduler, various sectors of one cell may have different RTWPs, and how to determine the RTWP required by the cell scheduling becomes a problem; the signals of HSUPA UEs are also distributed differently in various sectors, thus the relationship between the load of the HSUPA UE and the RTWP of each sector cannot be distinguished only depending on the estimation of SIR by the HSUPA UE, which makes the scheduler disordered.

FIG. 2 is the schematic diagram of the conventional HSUPA scheduling method for a sectorized cell in the prior art. In the sectorized cell, each sector of the base station has its own antenna and different RTWP. In this case, if the conventional HSUPA scheduling method is utilized, the RTWPs of a plurality of sectors must be combined into one RTWP of the cell. In order to maintain system stability and prevent over elevation of RTWP, in common practice the maximum RTWP of the plurality of RTWPs is selected as the cell RTWP, otherwise a large overload rate will be induced. The shortcoming of the practice is that, when the resource of one sector has been distributed and the RTWP has achieved the target value, even if there is still resource in other sectors and RTWP is still comparative low, the resource can not be distributed to the HSUPA UE, which will result in resource waste and throughput limitation. Moreover, when the conventional HSUPA scheduling method is used in a sectorized cell, the SIR of the HSUPA UE has only one value, thus if the HSUPA UE is in a neighboring region of sectors, the receiving of the uplink multi-sector antenna has a diversity gain, so as to make the RTWP comparatively low, but the SIR is still about the same as that without diversity gain, thus the sum of HSUPA UE loads calculated based on the SIRs reaches the full load of the cell, but the load calculated based on the RTWPs is still comparative small, which results in that the conventional HSUPA scheduling algorithm will not distribute resource to the HSUPA UE any more, which also results in a large underload and throughput limitation.

According to the conventional method in the prior art, the poor relevancy between RTWP and SIR will result in a large overload or underload, and schedule is performed on the basis of cell, the throughput is equal to that of a conventional cell, however, in theory, sectorized mode may make the throughput improved by several times compared with that of a conventional cell. Therefore the exiting HSUPA scheduling method shall be improved.

SUMMARY OF THE INVENTION

The present invention provides a sectorized scheduling method for g the high speed uplink packet access service, which solves the problem that the HSUPA scheduling results in a comparative large overload or underload in a sector based cell, and improves HSUPA throughput by several times.

In order to solve the above problem, the present invention provides a sectorized scheduling method for the high speed uplink packet access service, which comprises:

obtains a current sector load of each sector and a current load of the HSUPA service mobile station of each sector, and the allowable maximum sector load of each sector;

obtains a remaining available sector load according to the allowable maximum load of each sector and the current sector load, and performs load distribution to each sector respectively according to the remaining available sector load and the distribution state of each HSUPA mobile station in each sector.

Further, the above method has the following characteristic, the current sector load is obtained according to a current Receive Total Wideband Power, RTWP of each sector.

Further, the above method has the following characteristic, the current RTWP of each sector is measured and obtained by the Radio Frequency, RF module of each sector.

Further, the above method has the following characteristic, the load of each HSUPA UE is obtained according to a Signal to Interference Ratio, SIR of each HSUPA mobile station in each sector.

Further, the above method has the following characteristic, the SIR of the HSUPA mobile station in each sector is measured and obtained via the following method, the value of the SIR of the HSUPA mobile station in each sector is sectorized estimated according to the difference of the sectors to which the uplink signal demodulation path of each HSUPA mobile station belongs.

Further, the above method has the following characteristic, performing load distribution to each sector respectively specifically is: the load of the HSUPA service that can be distributed to the mobile state of the sector is obtained according to the remaining available sector load and the load of each HSUPA mobile station of the sector, the load of the HSUPA service is distributed according to the SIR of each HSUPA mobile station in each sector.

Further, the above method has the following characteristic, the allowable maximum sector load of each sector is calculated via the following steps:

obtains parameter of a target value of the RTWP of each sector and a reference value of the RTWP of each sector;

obtains the allowable maximum sector load of each sector, which is the obtained by dividing the difference between the target value of the RTWP of each sector and the reference value of the RTWP of each sector by the target value of the RTWP;

the current sector load of each sector being obtained in the following way:

obtains the parameter of the reference value of the RTWP of each sector;

sets the value obtained by dividing the difference between the current RTWP and the reference value of the RTWP by the current RTWP as the current load of each sector.

Further, the above method has the following characteristic the current load of the HSUPA mobile station in each sector is calculated by the following equation:

the load of a mobile station in a sector=(the SIR of the mobile station in the sector)/(1+the SIR of the mobile station in the sector).

The present invention also provides a system for sectorized scheduling High-Speed Uplink Packet Access, HSUPA, service, which comprising an HSUPA service sectorized scheduler, which is configured to obtain a current sector load of each sector, a current load of an HSUPA mobile station of each sector and an allowable maximum sector load; to obtain an available remaining sector load according to the allowable maximum load of each sector and the current sector load of each sector; to perform distribution load to each sector according to the remaining available sector load of each sector and the distribution state of each HSUPA mobile station in each sector.

Further, the above system has the following characteristic, the system also comprises a Radio Frequency, RF, module which is configured to measure a current Receive Total Wideband Power (RTWP), of a sector, and to send the RTWP to the HSUPA service sectorized scheduler, which obtains the current sector load of the sector according to the current RTWP.

Further, the above system has the following characteristic, the system also comprises a Signal to Interference Ration (SIR), sectorized estimating module, which is configured to estimate the SIR value of the HSUPA in each sector according to the difference of the sectors to which uplink signal demodulation path of the HSUPA mobile station belongs, and to send the SIR to HSUPA service sectorized scheduler, which calculates the current load of the HSUPA UE in each sector according to the SIR of the HSUPA mobile station in each sector.

Further, the above system has the following characteristic, the HSUPA service sectorized scheduler performing load distribution to each sector specifically is: obtains load of HSUPA service that can be distributed to the mobile station of the sector according to the remaining available sector load and the load of each HSUPA mobile station of the sector and the load of the HSUPA service is distributed according to the SIR of each HSUPA mobile station in each sector.

The benefic effects of the present invention are correctly associating the load of HSUPA mobile station and the sector load, solving the problem of a large overload or a large underload, and improving the HSUPA throughput by several times in a sectorized cell scheme.

DETAILED DESCRIPTION OF THE EMBODIMENTS

The present invention will be further detailed in connection with the drawings and embodiments.

Figure 1:
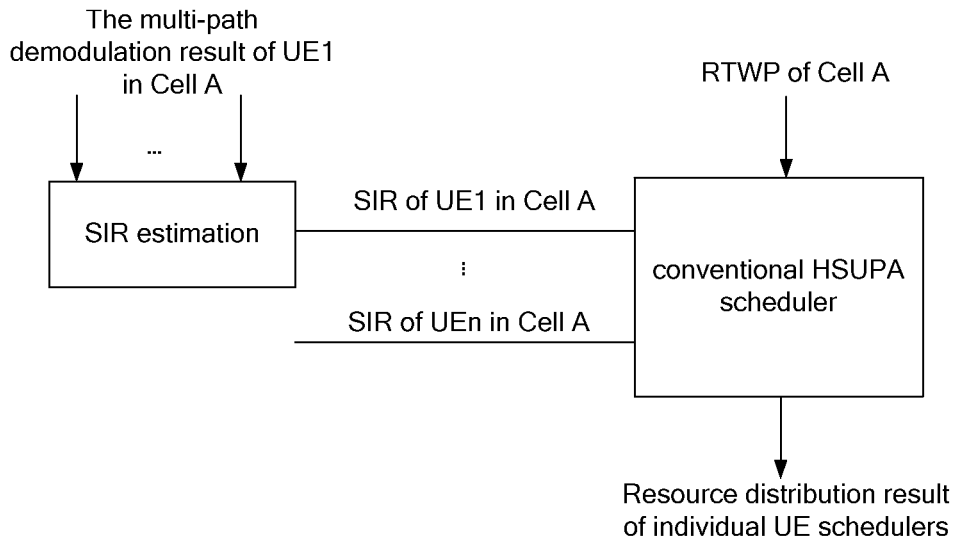
FIG. 1 is the schematic diagram of a convention HSUPA scheduling method of a conventional cell.
Figure 2:
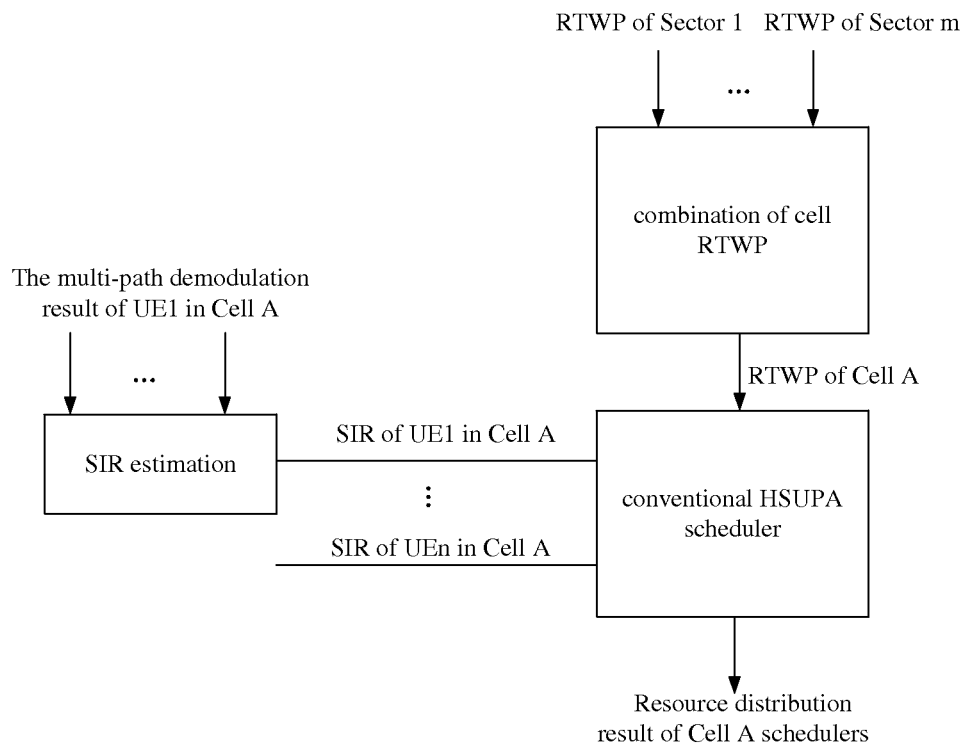
FIG. 2 is the schematic diagram of a conventional HSUPA scheduling method for a sectorized cell in the prior art.
Figure 3:
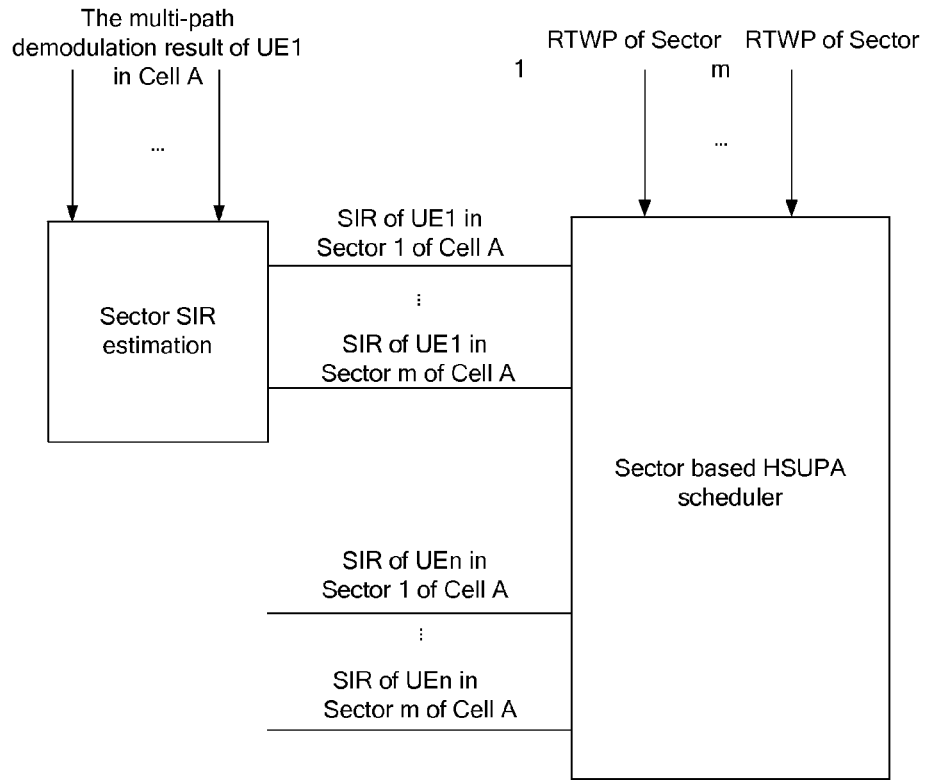
FIG. 3 is the schematic diagram of the sectorized scheduling method for the HSUPA of the present invention.

FIG. 3 is the schematic diagram of the sectorized scheduling method for the High Speed Uplink Packet Access, HSUPA of the present invention. Compared with the conventional method the prior art, the RTWP of the sectorized scheduling method is the RTWP of all sectors, the sectorized estimation of the Signal to Interference Ratio (SIR) of HSUPA User Equipment (UE) is performed, and the result of sectorized estimation is input to a sectorized HSUPA scheduler. Thus in a sectorized HUSPA scheduler, RTWP and SIR can be correctly associated, load calculation and distribution can be performed in each sector, so as to reasonably utilize the resource, precisely control the load and improve the throughput.

Figure 4:
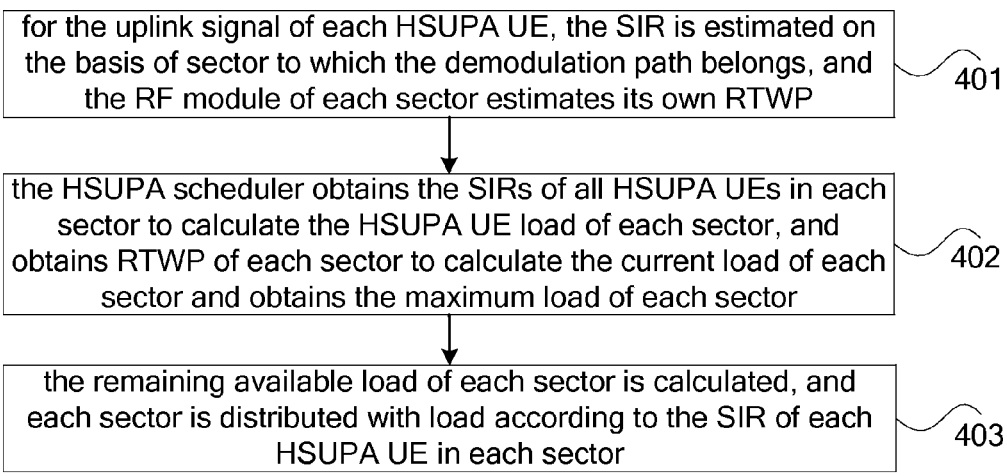
FIG. 4 is the flow chart of the sectorized scheduling method for the HSUPA of the present invention.

FIG. 4 is the flow chart of the sectorized scheduling method for HSUPA of the present invention, which comprises following steps.

Step 401, for the uplink signal of each HSUPA UE, according to the difference of which the demodulation path belongs to, sectorization estimated the SIR, and the RF modules of each sector estimate the RTWP of their own. For some HSUPE UEs, only one or a few sectors have the demodulation path, the SIRs are estimated respectively with the corresponding demodulation result of the demodulation path in the one or a few sectors, the SIR of the sector without demodulation path is 0. The RTWP of each sector is measured by the Radio frequency (RF), module of each sector.

Step 402, the sectorized HSUPA scheduler obtains the SIRs of all HSUPA UEs in each sector, and calculates the load of HSUPA UE of each sector, and the sectorized HSUPA scheduler also obtains Received Total Wideband Power, RTWP, from the RF module of each sector, and calculates the current load of each sector and obtains the maximum load of each sector.

Generally, the method for calculating the load of HSUPA UE is: Lue=SIR/(1+SIR);

the method for calculating the load of sector is: Lsector= (RTWP−RTWPref)/RTWP;

the current load of a sector means the value of Lsector when the RTWP value is the RTWP of the current sector, the maximum sector load means the value of Lsector when the RTWP value is RTWPtarget, which is the allowable using target value or the maximum value to the sector RTWP.

Step 403, the remaining available load of each sector is calculated, and each sector is performed load distribution according to the SIR of each HSUPA UE in each sector.

The remaining available load is calculated according to the maximum sector load and the current load, the value that the maximum load minus the current load is the remaining available sector load the value that the remaining available sector load plus the load of the HSUPA UE in the sector is the HSUPA load which can be distributed to the UE, the HSUPA load is distributed according to the SIR of each UE.

The sectorized load distribution method of the present invention can plenty utilize the load of each sector, and ensure that each sector has a comparative low overload.

Figure 5:
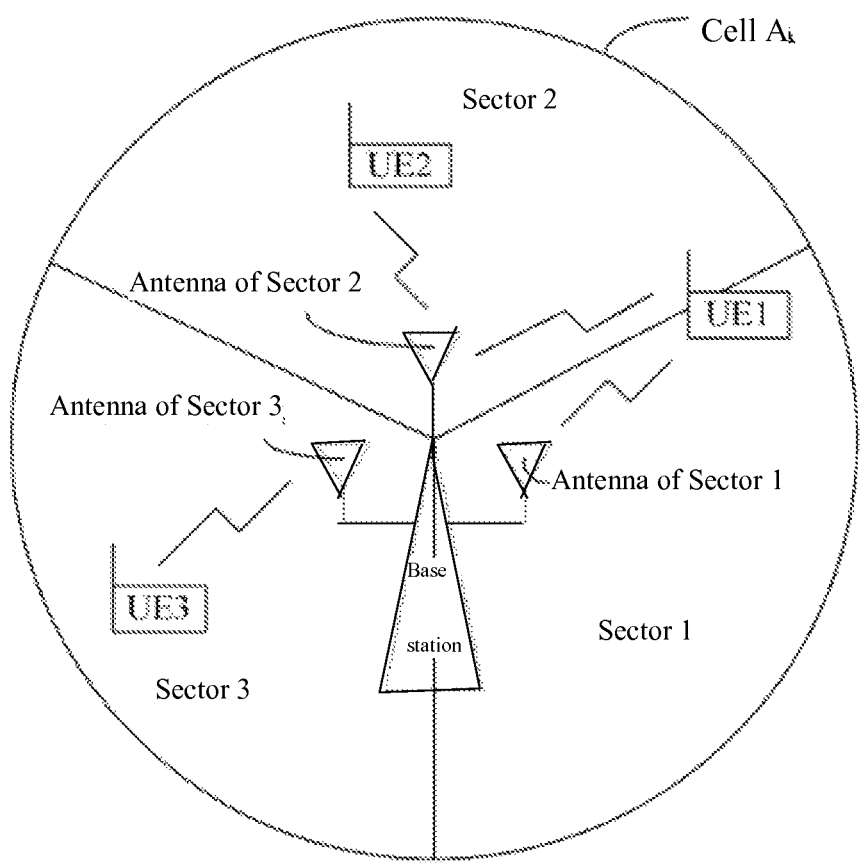
FIG. 5 is the schematic diagram of a preferable embodiment of the system to which the method is applied of the present invention.

FIG. 5 is the schematic diagram of an embodiment of the system to which the method of the present invention is applied. Cell A in the base station is divided into 3 sectors, each sector has its own base station antenna. It is assumed that there 3 HSUPA UEs respectively being, UE1, UE2, UE3, each UE requires a load resource as large as possible.

Wherein, UE1 is located nearby the boundary between Sector 1 and Sector 2, thus both Sector 1 and Sector 2 can receive the uplink signal from UE1, that means, the RTWPs of Sector 1 and Sector 2 are affected by UE1, the SIRs of UE1 in Sector 1 and Sector 2 are not equal to 0 (e.g., 0.2), but the SIR of UE1 in Sector 3 is 0.

UE 2 is completely located in Sector 2, thus only the RTWP of Sector 2 is affected, that means, only the load of Sector 2 is consumed, and only the SIR of Sector 2 is not 0 (e.g., 0.7), the SIRs in other sector are not 0.

UE 3 is completely located in Sector 3, the SIR of UE3 is 1.

The SIR of each HSUPA UE in each sector is:

| HSUPA UE | SIR1 in Sector 1 | SIR2 in Sector 2 | SIR3 in Sector 3 |
| --- | --- | --- | --- |
| UE1 | 0.2 | 0.2 | 0 |
| UE2 | 0 | 0.7 | 0 |
| UE3 | 0 | 0 | 1 |

The load of a HSUPA UE in each sector is calculated according to above Sir:

| HSUPA UE | Load of Sector 1 | Load of Sector 2 | load Sector 3 |
| --- | --- | --- | --- |
| UE1 | 0.1667 | 0.1667 | 0 |
| UE2 | 0 | 0.4118 | 0 |
| UE3 | 0 | 0 | 0.5 |

The RTWPtarget of each sector is higher than RTWPref by 6 dB, that means, the allowable maximum sector load is 0.75, wherein, RTWPref=−106 dBm. It is assumed that the current RTWPs of each sector respectively are −105.20 dBm, −102.24 dBm, −102.99 dBm, which are converted into linear values and applied to Equation (1) to obtain the current loads of sectors which are 0.1667, 0.5785, 0.5. The remaining available loads of each sector are the maximum sector loads (it is 0.75 in the embodiment) minus the loads of the sector, and respectively being 0.5833, 0.1715, 0.25 for each sector.

The loads which can be performed distribution to the HSUPA user are equal to the remaining available loads plus the current loads of HSUPA users, and respectively being 0.75, 0.75, 0.75. In the embodiment, there is no non-HSUPA user (e.g., pure voice user) in the present cell, and the interferences on the present cell by other cells will not be considered, thus the calculated load is just equal to the sum of the loads of each HSUPA UE in the sector. In a realistic system, it is possible that the existence of the interferences by the non-HSUPA user and other cell results in that the load calculated based on the RTWP is greater than the sum of loads of each HSUPA user, thus the load that can be performed distribution to the HSUPA user is less than 0.75.

The loads that can be distributed are performed distribution to each HSUPA UEs, and different distribution methods are available based on different rules. For example, According to the maximum throughput of cell rule, all the loads of Sector 1 and Sector 2 can be performed distribution to UE1, the load which UE2 obtained is 0, UE3 obtains all the load of Sector 3, thus the 3 sectors achieve full load, and the total load of the cell is 0.75*3=2.25, and the throughput also comes to the maximum. It is obvious that such a distribution is unfair to UE2 which can not perform HSUPA service communication.

If a comparative fair rule is employed, which requires that the HSUPA UEs in a same sector have same throughput, in above example, because UE1 can occupy the loads of Sector 1 and Sector 2, and proportion relation of the loads of the two sectors is 1:1 (because the value of SIRs of UE1 in both Sector 1 and Sector 2 are same), the proportion relation is determined by wireless environment, thus the proportion relation of the loads of UE1 and UE2 in Sector 2 shall be 1:2 to ensure that the throughput of UE1 and that of UE2 are equal in essence. by utilizing the sectorized scheduling method, the remaining available load of Sector 3(0.75) can be performed distribution to UE3, 0.5 of the load of Sector 2 can be performed distribution to UE2, and a quarter of the load of Sector 2 can be performed distribution to UE1. When, although Sector 1 can perform distribution all the available load (0.75)

to UE1, but in order to make Sector 2 not overload, the load consumed by UE1 in Sector 1 is less than 0.75, for example, the actually consumed load is 0.25. Finally, the load sum of the 3 UEs is 0.75+0.5+(0.25+0.25)=1.75, it is also total load of the cell, each sector loads are 0.25, 0.75, 0.75 respectively. Upon distribution as described above, the distribution of expected each HSUPA UE in each sector is:

| HSUPA UE | SIR1 in Sector 1 | SIR2 in Sector 2 | SIR3 in Sector 3 |
|---|---|---|---|
| UE1 | 0.3333 | 0.3333 | 0 |
| UE2 | 0 | 1 | 0 |
| UE3 | 0 | 0 | 3 |

If UE1 moves into Sector 1, each HSUPA UE can obtain a load of 0.75, the total load is 0.75*3=2.25. If a conventional scheduling method is employed, since the signal distribution of a HSUPA UE in each sector is unknown, the load sum of each UE which calculated according to the SIR of each HSUPA UE shall not more than 0.75, that is in order to prevent overload, the load perform distribution to each HSUPA UE is less than 0.75, in the case that UEs is performed distribution in individual sectors, each sector is in underload state. Thus the sectorized scheduling method is employed to cope with underload phenomena and improve HSUPA throughput by several times.

The present invention also provides a system for sectorized scheduling the HSUPA service, which comprises an HSUPA service sectorized scheduler, which configured to obtain the current sector load, the load of the current HSUPA mobile station in each sector, and the allowable maximum sector load of each sector; the remaining available sector load is obtained according to the allowable maximum load of each sector and the current sector load of each sector, to perform load distribution to each sector according to the remaining available sector load of each sector and the distribution state of each HSUPA mobile station in each sector The system also comprises a Radio Frequency, RF, module, which is configured to r measure a current, Received Total Wideband Power, RTWP, of a sector and to send the RTWP to HSUPA service sectorized scheduler, which obtains the current sector load of the sector according to the current RTWP.

The system also comprises a Signal to Interference Ratio, SIR, sectorized estimating module, which is configured to sectorized estimate the SIR value of the HSUPA in each sector according to the difference of the sectors to which the uplink signal demodulation path of the HSUPA mobile station belongs, and to send the SIR to the HSUPA service sectorized scheduler which calculates the current load of the HSUPA mobile station in each sector according to the SIR of the HSUPA mobile station in each sector.

The HSUPA service sectorized scheduler performing load distribution to each sector specifically is: obtaining the load of HSUPA service that can be distributed to the mobile station of the sector according to the remaining available sector load and the load of each HSUPA mobile station of the sector, the load of HSUPA service is distributed according to the SIR of each HSUPA mobile station in each sector.

Based on above analysis, the method of the present invention which can be applied in a sectorized cell application to obtain considerable economic effects.

Above description is intended to detail the present invention in connection with the preferred embodiments, rather than limit the present invention thereof. Those skilled in the art can make various deductions or alterations without departing from the idea of the present invention, these deductions and alterations are also protected by the present invention.

INDUSTRIAL PRACTICABILITY

The present invention has the beneficial effects are: In the project of sectorized cell project, correctly associating the HSUPA UE load and the sector load, solving the problem of the large overload or the large underload, and improving the HSUPA throughput by several times.

What is claimed is:

1. A sectorized scheduling method for High-Speed Uplink Packet Access (HSUPA) service, comprising:
   initiating from a base station,
   obtaining a current sector load of each sector of a cell, a current load of each HSUPA mobile station of each sector of the cell, and an allowable maximum sector load of each sector of the cell; and
   obtaining a remaining available sector load according to the allowable maximum sector load of each sector and the current sector load, obtaining a load of the HSUPA service of each sector that can be distributed to each HSUPA mobile station of the sector according to the remaining available sector load and the load of each HSUPA mobile station of the sector, and distributing the load of the HSUPA service to the HSUPA mobile station of the sector according to a Signal to Interference Ratio (SIR) of each HSUPA mobile station in each sector;
   wherein the SIR of each HSUPA mobile station in each sector is measured and obtained via the following method: for each sector, if the sector has an uplink signal demodulation path of any one of HSUPA mobiles, then the value of the SIR of this HSUPA mobile in the sector is estimated, otherwise the value of the SIR of this HSUPA mobile in the sector is 0.

2. The sectorized scheduling method for HSUPA service according to claim 1, wherein the current sector load is obtained according to a current Received Total Wideband Power (RTWP) of each sector.

3. The sectorized scheduling method for HSUPA service according to claim 2, wherein the current RTWP of each sector is measured and obtained by a Radio Frequency (RF) module of each sector.

4. The sectorized scheduling method for HSUPA service according to claim 2, wherein the allowable maximum sector load of each sector is calculated via the following steps:
   obtaining a target value of RTWP of each sector and a reference value of the RTWP of each sector;
   setting a value, which is obtained by dividing the difference between the target value of the RTWP of each sector and the reference value of the RTWP of each sector by the target value of the RTWP, as the allowable maximum sector load of each sector;
   the current sector load of each sector being obtained in the following way:
   obtaining the parameter of the reference value of the RTWP of each sector;
   setting a value, which is obtained by dividing the difference between the current RTWP and the reference value of the RTWP by the current RTWP, as the current sector load of each sector.

5. The sectorized scheduling method for HSUPA service according to claim 1, wherein the load of each HSUPA mobile station is obtained according to a SIR of each HSUPA mobile station in each sector.

6. The sectorized scheduling method for HSUPA service according to claim 5, wherein the current load of the HSUPA mobile station in each sector is calculated by the following equation:

the load of a mobile station in a sector=(the SIR of the mobile station in the sector)/(1+the SIR of the mobile station in the sector).

7. The sectorized scheduling method for HSUPA service according to claim 1, wherein the allowable maximum sector load of each sector is calculated via the following steps:
obtaining a target value of RTWP of each sector and a reference value of the RTWP of each sector;
setting a value, which is obtained by dividing the difference between the target value of the RTWP of each sector and the reference value of the RTWP of each sector by the target value of the RTWP, as the allowable maximum sector load of each sector;
the current sector load of each sector being obtained in the following way:
obtaining the parameter of the reference value of the RTWP of each sector;
setting a value, which is obtained by dividing the difference between the current RTWP and the reference value of the RTWP by the current RTWP, as the current sector load of each sector.

8. A sectorized scheduling system for High-Speed Uplink Packet Access (HSUPA) service, comprising
an HSUPA service sectorized scheduler, which is configured to obtain a current sector load of each sector of a cell, a current load of an HSUPA mobile station of each sector of the cell and an allowable maximum sector load of each sector of the cell; to obtain an available remaining sector load according to the allowable maximum load of each sector and the current sector load of each sector; to obtain a load of the HSUPA service that can be distributed to the HSUPA mobile station of the sector according to the remaining available sector load and the load of each HSUPA mobile station of the sector, and to distribute the load of the HSUPA service to the HSUPA mobile station of the sector according to the SIR of each HSUPA mobile station in each sector;
an SIR sectorized estimating module, which is configured to estimate the SIR value of each HSUPA mobile station in each sector, and to send the SIR to the HSUPA service sectorized scheduler, which calculates the current load of each HSUPA mobile station in each sector according to the SIR of each HSUPA mobile station in each sector;
wherein estimate the SIR value of each HSUPA mobile station in each sector comprises: for each sector, if the sector has an uplink signal demodulation path of any one of HSUPA mobiles, then the value of the SIR of this HSUPA mobile in the sector is estimated, otherwise the value of the SIR of this HSUPA mobile in the sector is 0;
a hardware processor, configured to execute the HSUPA service sectorized scheduler and the SIR sectorized estimating module.

9. The system according to claim 8, wherein the system also comprises a Radio Frequency (RF) module, which is configured to measure a current Received Total Wideband Power (RTWP) of a sector, and to send the RTWP to the HSUPA service sectorized scheduler, which obtains the current sector load of the sector according to the current RTWP.

* * * * *